Patented Jan. 10, 1950

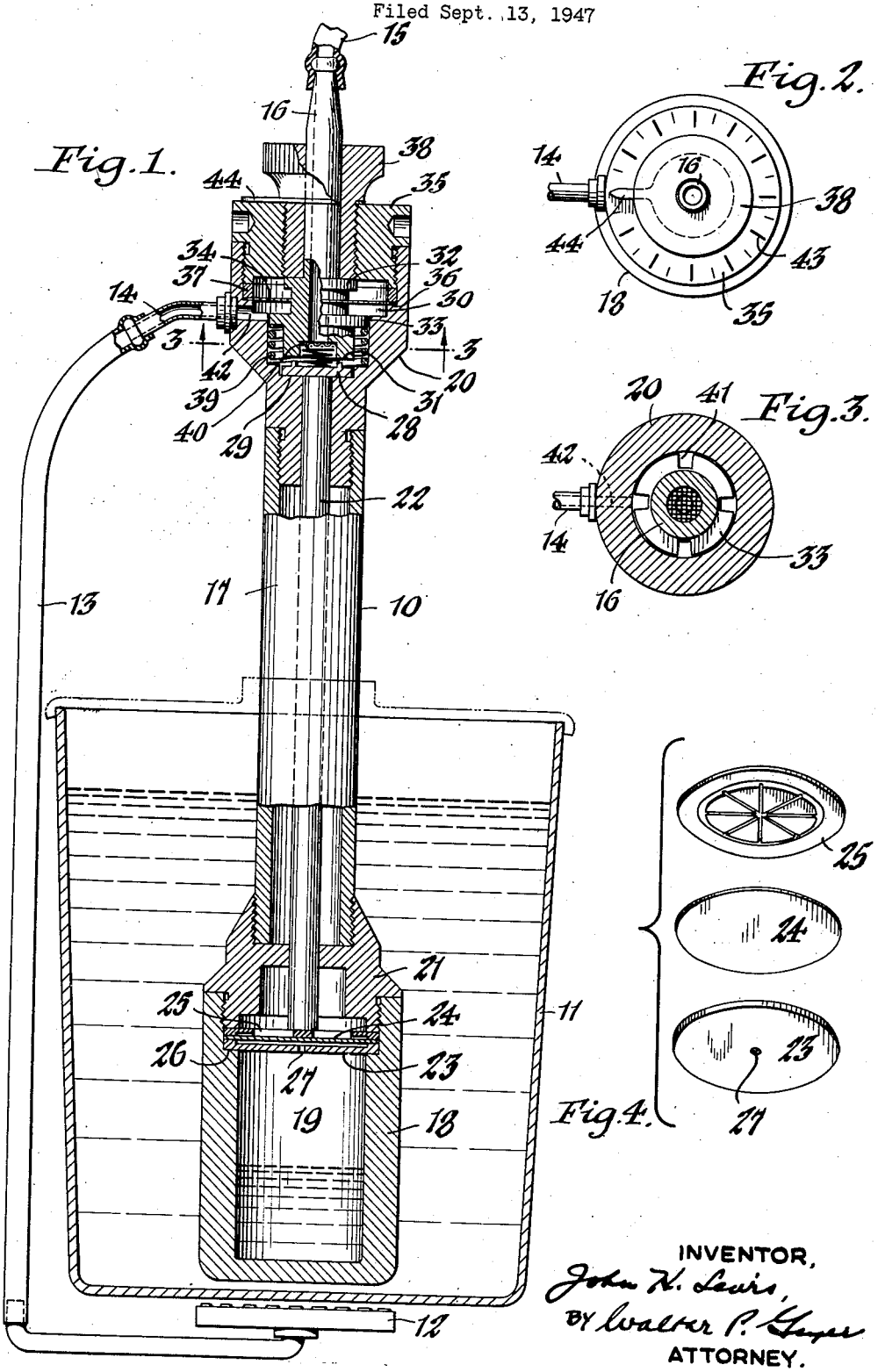

2,494,299

UNITED STATES PATENT OFFICE 2,494,299

TEMPERATURE CONTROL DEVICE

John H. Lewis, Buffalo, N. Y., assignor to Buffalo Dental Manufacturing Company, Buffalo, N. Y., a corporation of New York Application September 13, 1947, Serial No. 773,799

5 Claims. (Cl. 236—32)

This invention relates generally to improvements in temperature control devices but more particularly to a device for maintaining the temperature of water or like fluid at a predetermined point.

It has for one of its objects to provide a device of this character which is so designed and constructed as to be positive and reliable in operation, and which operates to automatically cut down the flow of gas or like heating medium when the temperature of the water has reached a predetermined point and to maintain such temperature for an indefinite period.

Another object of the invention is to provide a temperature control device wherein the operating parts thereof are sealed within the casing or housing, and wherein simple and effective regulating means are employed for pre-setting the device to the temperature desired.

Other features of the invention reside in the construction and arrangement of parts hereinafter described and particularly pointed out in the appended claims.

In the accompanying drawings:

Figure 1 is a sectional side elevation of the control device embodying my invention. Figure 2 is a top plan view thereof. Figure 3 is a horizontal section taken on line 3—3, Figure 1. Figure 4 is a detached, exploded perspective view of a valve-governing diaphragm unit located in the base section of the device.

Similar characters of reference indicate corresponding parts throughout the several views.

Referring now to the drawings showing the preferred embodiment of my invention, 10 indicates generally the temperature control device which for use is immersed in a tank 11 of water whose temperature is to be controlled, the device being suspended therein in any suitable manner, as shown in Figure 1. In the example shown, the device is used as a dental appliance for controlling the temperature of the water in the curing of resins used in dentistry. The water is heated by a gas burner 12 connected by a hose 13 to a discharge nipple 14 extending from the upper side of the device, while a hose 15 communicating with the source of gas supply is connected to an intake nipple 16 yieldingly suspended at the upper end of the device, the latter functioning to automatically and thermostatically govern the flow of gas to the burner as determined by the temperature of the water desired.

The device consists of a body including a central tubular section 17, a lower section 18 providing an expansion chamber 19 for receiving a suitable liquid which expands when heated, and an upper chambered section 20 housing the gas flow control mechanism and with which the gas intake nipple 16 and the gas outlet nipple 14 communicate. A coupling collar 21 serves to connect the lower end of the tubular section with the lower chamber-section and extending freely through such tubular section to the lower portion of the gas chamber section and guided for movement axially thereof, in the manner shown in Figure 1, is a thrust rod 22 which is supported at its lower end on a heat-responsive diaphragm preferably composed of three metallic disks 23, 24 and 25 clamped at their edges between a shoulder 26 formed adjacent the upper end of the chamber-section 19 and the opposing end of the collar 21. The lower disk 23 has a central perforation 27 therein through which the expanding liquid is directed when heated for causing an upward displacement of the diaphragm and a corresponding upward movement to be imparted to the rod 22 for regulating the valve mechanism.

The thrust rod 22 serves to initiate a valve mechanism for controlling the flow of gas to the burner 12 and is adapted to abut at its upper end against a valve disk 28 centered axially over such rod in a recess 29 formed in the lower chambered portion 30 of the upper body section 20 and adapted to be projected toward and from a valve-seat 31 formed at the lower end of the intake nipple 16 which is yieldingly suspended in axial alinement with the rod. This nipple extends downwardly into the chamber portion 30, as shown in Figure 1, and has axially-spaced upper and lower flanges 32 and 33 thereon, and between these flanges and likewise spaced therefrom is a metallic diaphragm 34, from which the nipple is suspended and which provides a seal for preventing the escape of gas from the chamber. The open upper end of the body section 20 is fitted with a screw cap or plug 35 and the outer edge of this diaphragm 34 is seated on a shoulder 36 while a washer 37 is clamped to its top side through the medium of such screw cap. Slidingly fitted over the projecting upper end of the nipple 16 is an adjusting sleeve 38 which is threadedly connected to the screw cap 35 for adjustment relative thereto and abutting at its lower end against the upper nipple-flange 32. A spring 36 surrounding the lower portion of the intake nipple and bearing at one end against the bottom of the lower chambered portion 30 of the body section 20 and at its other end against the lower nipple-flange 33 tends constantly to urge the nipple 16 upwardly to bring its upper flange 32 in abutting contact with the lower end of the adjusting sleeve 38 and its valve-seat 31 clear of the top face of the valve disk 28. A light spring 40 is seated in a socket in the bottom of the enlarged lower portion of the gas feed nipple and bears against the top face of the valve disk to urge it against the top of the thrust rod 22. The lower nipple-flange 33 has a plurality of peripheral gas-escapement notches 41 therein and the side of the body section 20 has a gas outlet port 42 therein which registers with the nipple 14.

By this construction, the operative and gas-controlling elements of this device are in axial alinement to promptly and effectually respond to the increased temperatures in the water tank and to accurately regulate the valve displacement to accordingly govern the flow of gas to the burner and maintain the water at the temperature desired.

For the purpose of setting the device or instrument at the temperature desired for a given curing operation, the top face of the screw cap 35 is calibrated in degrees, say at 160° F., 170° F., 190° F., and 212° F., as indicated at 43, and a radial pointer 44 is attached to the adjusting sleeve 38 in traversing relation to the temperature scale. By turning the sleeve with its pointer to the temperature desired, the gas intake nipple 16 is accordingly axially adjusted to bring its valve-seat 31 into proper predetermined relation to the valve 28, so that when the desired temperature of the water is reached, the valve is gradually lifted by the diaphragm-actuated thrust rod 22 into closer relation to such seat to cut down the flow of gas to the burner. Some technics for curing resins require holding the water temperature at a comparatively low degree for a given time and increasing it at certain intervals until a final finishing temperature is reached. This device effectually permits such temperature changes and insures the desired temperatures being maintained for indefinite periods.

I claim as my invention:

1. A controlling device of the character described, comprising a body adapted to be immersed in a body of liquid to be heated and having an expansion chamber at its lower end and a gas-receiving chamber at its upper end including a gas discharge port, a gas feed nipple yieldingly suspended in the upper end of said body for axial displacement relative thereto and opening at its lower end into the lower portion of said gas chamber and having a downwardly-facing valve-seat thereon, a suspension member for the nipple disposed between the upper and lower ends of said gas-receiving chamber and above the discharge port thereof and forming a seal for preventing the escape of gas from said chamber, a valve in the lower portion of said chamber in governing relation to said valve-seat and including a spring for normally urging it to an open, unseated position, a diaphragm in said expansion chamber, and a thrust rod in operative relation at one end with said diaphragm and in abutting engagement at its other end with said valve for displacing it toward its valve-seat.

2. A controlling device of the character described, comprising a body adapted to be immersed in a body of liquid to be heated and having an expansion chamber at its lower end and a gas-receiving chamber at its upper end including a gas discharge port, a gas feed nipple suspended for axial movement in the upper end of said body and having the lower portion thereof opening into said gas chamber and having a valve-seat thereon, a spring interposed between the lower end of said body and said nipple for normally urging the latter upwardly, a valve in correlation with said valve-seat, a diaphragm-actuated means in operative relation at one end with said expansion chamber and at its opposite end with said valve for displacing the latter toward its valve-seat, and means axially adjustable relatively to said body and in operative relation to and for adjusting said nipple to predetermined temperature set positions to bring the valve-seat thereof in corresponding relation to the valve.

3. A controlling device of the character described, comprising a body adapted to be immersed in a body of liquid to be heated and having an expansion chamber at its lower end and a gas-receiving chamber at its upper end including a gas discharge port, a gas feed nipple suspended in the upper end of said body for movement axially thereof and opening at its lower end into said gas chamber and having a downwardly-facing valve-seat thereon, a suspension diaphragm for said nipple disposed across the gas-receiving chamber above its discharge port and forming a seal for preventing the escape of gas from such chamber, a spring for normally urging said nipple upwardly to a predetermined position, a valve disposed in the bottom of said gas chamber in governing relation to said valve-seat and including a spring for normally urging it to an open, unseated position, a diaphragm in said expansion chamber, and a thrust rod interposed between and abutting at its opposite ends with said valve and said diaphragm.

4. A controlling device of the character described, comprising a body adapted to be immersed in a body of liquid to be heated and having an expansion chamber at its lower end and a gas-receiving chamber at its upper end including a gas discharge port, a gas feed nipple suspended in the top of said body for displacement axially thereof and having the lower portion thereof opening into said gas chamber and terminating at its lower end in a downwardly-facing valve-seat, a suspension diaphragm for said nipple disposed across the gas-receiving chamber above its discharge port and forming a seal for preventing the escape of gas from such chamber, a valve in correlation with said valve-seat, a diaphragm in said expansion chamber, a thrust rod interposed between and abutting at its opposite ends with said valve and said diaphragm, and means axially adjustable relatively to said body and operatively engageable with the nipple for displacing and presetting it to bring its valve-seat in one or another of a plurality of positions relative to said valve.

5. A controlling device of the character described, comprising a body adapted to be immersed in a body of liquid to be heated and having an expansion chamber at its lower end and a gas-receiving chamber at its upper end including a gas discharge port, a gas feed nipple suspended in the top of said body for displacement axially thereof and having the lower portion thereof opening into said gas chamber and terminating at its lower end in a downwardly-facing valve-seat, a suspension diaphragm for said nipple disposed across the gas-receiving chamber above its discharge port and forming a seal for preventing the escape of gas from such chamber, a valve in the lower portion of the gas-receiving chamber in correlation with said valve-seat, a diaphragm in said expansion chamber, a thrust rod interposed between and abutting at its opposite ends with said valve and said diaphragm, a spring interposed between the bottom of the gas-receiving chamber and said nipple for urging the latter upwardly to a predetermined position and means for pre-setting said nipple to bring its valve-seat in one or another of a plurality of positions relative to said valve, said means including a rotatable sleeve adjustable axially of the body and for operative engagement with said nipple for bringing its valve-seat in one position or another relative to said valve, said body having a calibrated temperature scale thereon, and a pointer on said sleeve in correlation with said scale.

JOHN H. LEWIS.

REFERENCES CITED

The following references are of record in the file of this patent:

UNITED STATES PATENTS

| Number | Name | Date |
|---|---|---|
| 575,042 | Rowe | Jan. 12, 1897 |
| 897,740 | Fulton | Sept. 1, 1908 |
| 1,117,790 | Chapman | Nov. 17, 1914 |
| 1,120,707 | Froehlich | Dec. 15, 1914 |
| 1,884,794 | McKee | Oct. 25, 1932 |
| 2,436,651 | Krisor | Feb. 24, 1948 |

FOREIGN PATENTS

| Number | Country | Date |
|---|---|---|
| 136,532 | Great Britain | Nov. 25, 1920 |
| 271,582 | Germany | Mar. 16, 1914 |